Patented Aug. 29, 1950

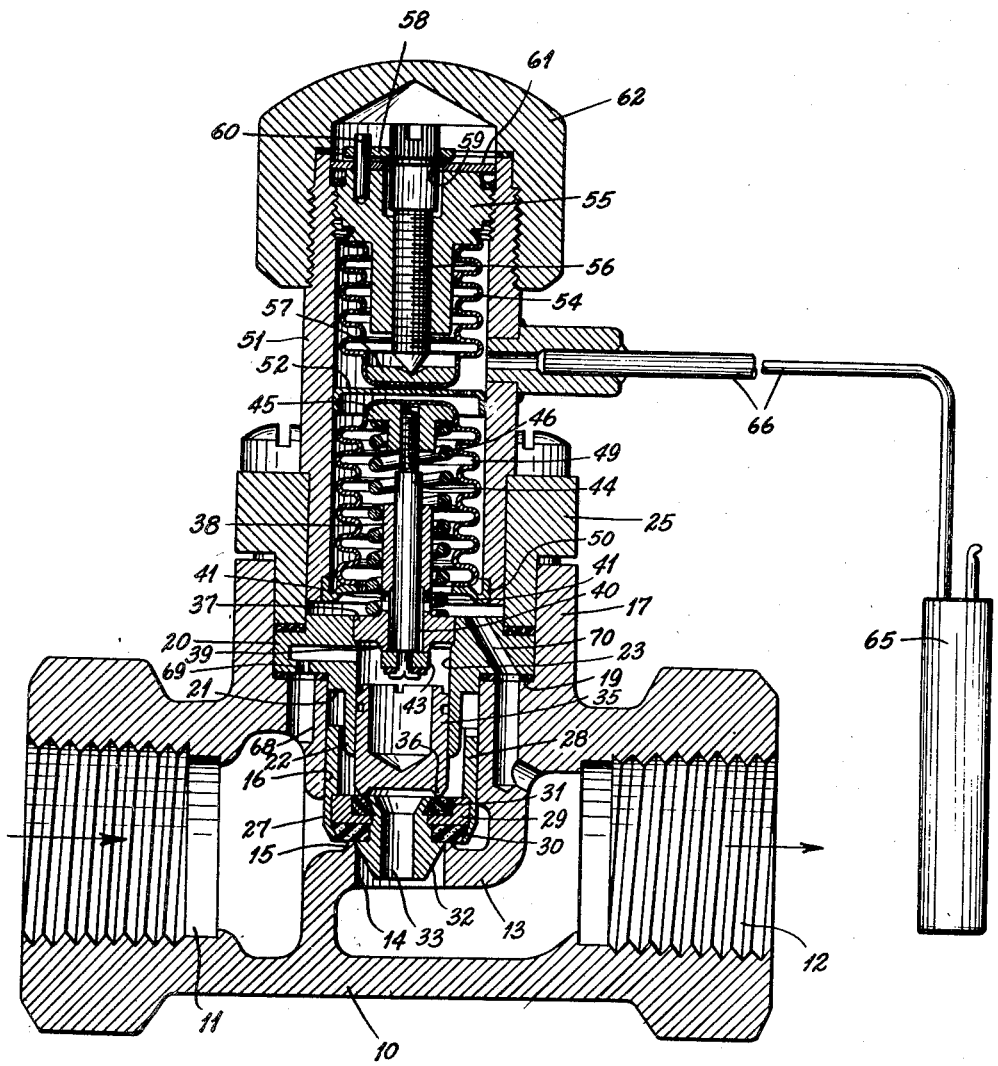

2,520,216

UNITED STATES PATENT OFFICE 2,520,216

SNAP ACTION SUCTION VALVE

Edward F. Kounovsky and John E. Dube, St. Louis, Mo., assignors to Alco Valve Company, University City, Mo., a corporation of Missouri Application September 17, 1945, Serial No. 616,686

18 Claims. (Cl. 236—80)

The present invention relates to a snap action suction valve, and especially to a valve of this kind that is temperature-responsive, and pilot operated.

It is an object of the invention to provide a valve of this type that is quick opening. A particular object is to provide such a valve that opens on rise in temperature for use in a refrigeration system, and operates so as to minimize short cycling of the compressor.

Another object is to provide such a valve as will give automatic defrosting of the evaporator for air temperatures above freezing.

Another object is to provide a valve having readily operable, compact, sealed, adjusting means, by which the temperature of operation may be regulated.

A further object is to provide a pilot operated valve of this type, with adjusting means, all compactly arranged for economy of construction and assembly, and of space occupied.

The drawing is an axial cross section of the valve.

The valve comprises a valve housing or body 10, having an inlet 11 and an outlet 12 separated by a partition 13 provided with the customary valve port 14 surrounded by an elevated, annular valve seat 15.

The valve body 10 has a cylindrical bore 16 above the port 14 and co-axial therewith. The body 10 also has an annular flange 17 upstanding from its top surface, the flange having an inner cylindrical surface co-axial with, but larger than, the bore 16. A circular ledge 19 joins the top of the bore 16 with the bottom of the flange.

A flanged sleeve 20 is adapted to be inserted within the flange 17, and to have its flange supported by the ledge 19 of the valve body. The sleeve extends slightly down into the bore 16, providing a shoulder 21, and the sleeve is thereby stabilized and centered. It also has a depending cylindrical skirt 22, the outer surface of which is spaced inwardly from the bore 16. A cylindrical opening 23 extends through the sleeve 20 from top to bottom, and is slightly enlarged at the top. The sleeve 20 is removably held clamped to the valve body 10 by a flanged clamping ring 25, having a flange fitting within the flange 17 of the valve body. Bolts clamp the parts together, and sealing is effected by the use of suitable gaskets, as shown.

The foregoing parts enclose a chamber for receiving a main valve and a pilot piston arrangement. The main valve member 27 is in the form of a piston cup, notched at its upper edge to prevent sealing off its interior from entering gas. It has a cylindrical side wall 28 freely slidable within the bore 16 of the body 10, and a bottom plug 29 secured thereto. The plug 29 holds lower and upper resilient valve closure inserts 30 and 31, as well as a restrictor plug 32 that aids in holding the inserts, and depends substantially into the valve port 14. The plug 32 has a port 33 therethrough. This main valve member 27 reciprocates vertically within the bore 16, to raise and lower the insert 30 from or to the valve seat 15.

A pilot piston 35 is shaped to reciprocate within the cylindrical opening 23 of the sleeve 20. This piston is cup-shaped, and has an inwardly tapered lower edge providing an annular valve seat 36 somewhat smaller in diameter than the piston itself. This piston 35 reciprocates within the cylindrical opening 23 toward and from the upper valve insert 31, and acts as a control valve to control flow of fluid from the interior of the cup-shaped valve piston 27 to the exterior thereof, by way of the port 33. The piston 35 is notched at its upper edge to prevent sealing off of its interior from a gas inlet.

The upper and slightly enlarged part of the opening 23 has permanently fixed therein a disc 37. This disc has a cylindrical guide stem 38 extending upwardly therefrom. The lower surface of the disc 37 has an annular valve seat 39 projecting therefrom and surrounding a valve port 40 through the disc and part of the stem 38, to register with radial ports 41 opening above the sleeve 20. Above the radial ports, the opening is smaller.

A pilot valve disc 43 is secured to a pilot valve stem 44 that is guided for reciprocating movement in the stem 38, and projects down below the pilot valve seat 39. The upper end of the stem 44 is secured into a buffer plate 45. A coil spring 46 surrounds the stem 38, and by engaging the disc 37 and the buffer plate 45, urges the latter upwardly, and the pilot valve disc 43 against its seat 39.

A bellows 49 fits over the buffer plate 45, and associated parts. At its lower end, the bellows is sealed to a ring 50 that is permanently united to a bellows enclosure 51, the latter being permanently fixed into the ring 25. A separator plate 52 is permanently secured across the interior of the enclosure 51, and has an opening therethrough to establish free communication above and below it.

The upper part of enclosure 51 receives an adjusting bellows construction. The adjusting bellows 54 is secured at its upper edge to a retainer plug 55 initially screwed into the top of the enclosure 51, but finally soldered thereto. The plug 55 has a portion depending within the bellows, and containing an adjusting screw 56 threaded therethrough. This screw is adapted to be engaged by a buffer plate 57 within the bottom of the bellows 54, to limit the collapse of the bellows. The screw 56 projects above the plug 55, and receives a pointer 58 fitted thereover to rest against a locating ring 59, and then fixed thereon. This pointer is adapted to engage a pin 60 pressed into the plug 55, which pin establishes the limits of rotation of the screw 56. The pointer 58 registers on a dial 61 centered in the enclosure 51.

The dial is enclosed by a sealing cap 62 threaded onto the enclosure 51 and sealed by suitable gaskets.

A thermal bulb 65 is connected by a capillary 66 into the enclosure 51. The bulb, capillary and enclosure are entirely filled with a solid charge of liquid having a low freezing point and a known coefficient of thermal expansion.

A pilot port 68 leads from the inlet side of the main valve, through a constriction 69, and into the cylindrical opening 23 above the pilot piston 35. The constriction is large enough to pass more gas than can leak by the piston 35 or main valve member 27, and small enough so that the rate of gas flow through the valve port 40, when open, is higher than that through the constriction. A bleeder port 70 communicates from the radial pilot valve openings 41 to the outlet side of the main valve.

*Operation*

When the valve is closed, as shown, inlet side gas will be acting through the pilot passage 68 to the top of the pilot piston 35. Owing to leakage around the pilot piston, inlet pressure will be acting downwardly within the main valve piston and on the pilot valve piston 35 over their entire upper surface areas. Inlet pressure will also act upwardly on the pilot piston over a small annular area defined by the outer periphery of the pilot piston, and the contact circle of the valve seat 36. Inlet pressure will act directly upwardly on the main valve over an annular area defined by the outer periphery of the main valve, and the contact circle of the valve seat 15. Outlet pressure will act upwardly on the main valve piston over an annular area equal, net, to the difference between the outermost bottom circle of the valve within the port 14 and the contact circle of the pilot piston seat 36. Outlet pressure will also act upwardly on the bottom of the pilot piston within the area of the seat 36. The diameter of the seat 15 is greater than that of the seat 36.

Inlet pressure above the pilot piston and main valve is confined by the closed pilot valve, whose disc 43 is seated against the seat 39.

The net pressures aforesaid are such as to keep the main valve 27 seated, and to keep the pilot piston 35 down and seated on the insert 31.

Should the temperature at the bulb 65 increase, the liquid in the system will expand. This will first collapse the bellows 54 until its buffer plate 57 is against the screw 56, and then will collapse the bellows 49 against the spring 46. This latter will open the pilot valve disc 43, permitting the inlet gas above the pilot piston to escape. The exhaust port system is substantially larger than the inlet through the constriction 69, or the bleed past the pistons.

At the time the exhaust is effective, the pressure conditions on the main piston 27 are unchanged, as the leakage past the piston 35 is too slow to relieve the pressure above the main piston and below the edge of the pilot piston. However, the pilot piston is now subjected to this high pressure, and otherwise to low side pressure. The pilot piston thereupon rises, relieving the high pressure, which escapes through the port 33 of the main valve. Relief of this pressure permits the main valve piston to rise under the influence of high pressure acting below its edge outside of the valve seat 15.

When the main valve opens, it passes the gas through the port 14, a pressure drop accompanying the passage. The gas within and adjacent the port 14 will be at an intermediate pressure, higher than that within the outlet 12, and hence higher than that acting above the pilot piston when the pilot valve is open. The member 32 projects into the port 14 to insure that the pressure conveyed to the upper side of the main valve piston 27 and the lower side of the pilot piston 35 will have this intermediate value.

This intermediate pressure will force the pilot piston all the way up. The main piston 27 will be forced up until its skirt 28 engages the shoulder 21, by the difference between inlet pressure on its lower surface and the intermediate pressure on its upper surface. Preferably, the main piston does not rise far enough to contact the pilot piston.

Should the temperature at the bulb 65 thereafter fall, the liquid will contract, and the spring 46 will close the pilot valve disc 43 against the seat 39. Inlet side pressure will then build up above the pilot piston as the constriction 69 admits more gas than can leak around the pistons, and inlet pressure then drives the pilot piston down against the main piston, and closes the valve seat 36 against the insert 31. Then, leakage past the pilot piston 35 and the main piston 27 will cause inlet pressure to build up above the main piston, forcing it downwardly. The pilot piston and main pistons will both be moved downwardly until the main valve is closed.

If the temperature of operation is to be changed, the cap 62 is removed, and the screw 56 turned. If the screw is turned to expand the bellows 54, it decreases the volumetric liquid capacity of the thermal system, causing the bellows 49 to be collapsed and the pilot valve opened by a lesser amount of expansion of the thermal liquid, and hence at a lower temperature. Conversely, withdrawal of the screw increases the liquid capacity and elevates the temperature of operation. The spring rate of the bellows 54 must be less than that of the operating bellows assembly.

This valve is not designed to modulate or throttle, but rather to operate to either open or shut positions. Once the main valve starts to open, introducing intermediate pressure below the pilot piston, the latter rises its full distance, owing to the increased opening pressure then acting upon it. The valve opens on an increase in temperature, and remains fully open until the temperature decreases sufficiently to cause the valve to close. When used to regulate the flow of gas from an evaporator in a refrigerant system, with the bulb responsive to temperature of the cooled fluid, it will minimize short cycling of the compressor, and for air temperatures above freezing, will provide automatic defrosting of the evaporator.

The pilot valve is permitted to overtravel a substantial distance in opening, so as to enable the screw 56 to be adjusted to lower the pilot valve closing temperature by maximum amounts. This feature also prevents injury to the structure in case of overheating of the bulb.

The disclosure of the drawing offers advantages over a construction wherein the pilot piston 35 is absent. Similar operating results can be obtained by making a device without the pilot piston and without the passage 33 through the main valve. Such arrangement requires a closely fitting main valve piston, whereas the present disclosure operates with a loose main piston. It is to be understood that the scope of the appended claims is not exclusive of the foregoing except by specified limitations.

What is claimed is:

1. In a valve, an inlet, a partition, a port in the partition, and an outlet, a main valve, a main piston connected for operating the main valve, a passage through the main piston, connecting the top side of the piston to the outlet side of the valve, a pilot piston, the lower side of the main piston being subjected to inlet pressure and having an effective pressure receiving area greater than that of the port, a control valve operated by the pilot piston to open and close the passage through the main piston, the pilot piston being subjected to the same pressure below it that acts on the top of the main piston and having a pressure receiving area greater than the size of the passage, the pilot piston being adapted to admit restricted flow of gas from above it to below it, constricted means independent of the position of the main valve, admitting inlet pressure to above the pilot piston comprising a constricting passage between and directly connecting the inlet and space above the pilot piston, an exhaust passage from above the pilot piston, a pilot valve to control the exhaust passage, means to open and close the pilot valve comprising a thermal bulb and expansible chamber, filled with liquid, and means to adjust the volumetric capacity of the chamber.

2. In a valve construction, a housing, an inlet, an outlet, a partition between them, a port in the partition, a main valve controlling the port, and comprising a main piston reciprocable within a cylinder in the housing, extending beyond the port to provide a pressure receiving area to operate the piston subjected to inlet pressure, tending to open the main valve, a passage through the main piston connecting the outer side of the main piston with the port, a pilot piston above the main piston and reciprocable within a cylinder on the housing, said pilot piston having parts adapted to seat on and close the passage through the main piston, constricted means constantly connected with the inlet, admitting inlet pressure to the upper side of the pilot piston comprising an open restricted passage between and directly connecting the inlet and the space above the pilot piston, more restricted passage means to admit inlet pressure below the pilot piston, above the main piston, said pilot piston being subjected to upward force of said inlet pressure below it for a limited area, and valve means to exhaust the pressure above the pilot piston.

3. In a valve construction, a housing, an inlet, an outlet, a partition between them, a port in the partition, a main valve controlling the port, and comprising a main piston reciprocable within a cylinder in the housing, extending beyond the port to provide a pressure receiving area to operate the piston subjected to inlet pressure, tending to open the main valve, a tubular portion extending from the main piston into the port for a substantial distance and adapted to provide a passage through the main piston connecting the outer side of the main piston with the port, a pilot piston smaller than the main piston, disposed above the main piston and reciprocable within a cylinder on the housing, said pilot piston having parts adapted to seat on and close the passage through the main piston, constricted means admitting inlet pressure to the upper side of the pilot piston, more restricted passage means to admit inlet pressure below the pilot piston, above the main piston, said pilot piston being subjected to upward force of said inlet pressure below it for a limited area, and valve means to exhaust the pressure above the pilot piston.

4. In a valve construction, a housing, an inlet, an outlet, a partition between them, a port in the partition, a main valve controlling the port, and comprising a main piston reciprocable within a cylinder in the housing, extending beyond the port to provide a pressure receiving area to operate the piston subjected to inlet pressure, tending to open the main valve, a tubular portion extending from the main piston into the port for a substantial distance and adapted to provide a passage through the main piston connecting the outer side of the main piston with the port, a pilot piston smaller than the main piston, disposed above the main piston and reciprocable within a cylinder on the housing, said pilot piston having parts adapted to seat on and close the passage through the main piston, constricted means admitting inlet pressure to the upper side of the pilot piston, more restricted passage means to admit inlet pressure below the pilot piston, above the main piston, said pilot piston being subjected to upward force of said inlet pressure below it for a limited area, means to establish exhaust communication between the cylinder space above the pilot piston and the outlet side of the valve, and valve means to control the exhaust means.

5. In a valve construction, a housing, an inlet, an outlet, a partition between them, a port in the partition, a main valve controlling the port, and comprising a main piston reciprocable within a cylinder in the housing, extending beyond the port to provide a pressure receiving area to operate the piston subjected to inlet pressure, tending to open the main valve, a tubular portion extending from the main piston into the port for a substantial distance and adapted to provide a passage through the main piston connecting the outer side of the main piston with the port, a pilot piston smaller than the main piston, disposed above the main piston and reciprocable within a cylinder on the housing, said pilot piston having parts adapted to seat on and close the passage through the main piston, constricted means admitting inlet pressure to the upper side of the pilot piston, more restricted passage means to admit inlet pressure below the pilot piston, above the main piston, said pilot piston being subjected to upward force of said inlet pressure below it for a limited area, means to establish exhaust communication between the cylinder space above the pilot piston and the outlet side of the valve, and valve means to control the exhaust means, said valve means comprising a valve member movable with the pilot piston, and the pilot piston being cup-shaped whereby the valve member may move within the pilot piston.

6. In a valve construction, a housing, an inlet, an outlet, a partition therebetween, a port in the partition, valve mechanism to regulate flow through the port, including a bellows arranged co-axially above the port, an enclosure on the housing to contain the bellows, pilot valve means operated by collapse and expansion of the bellows, a second bellows in the enclosure co-axial with and above the first bellows, means adjustably fixing the displacement of the second bellows, and an expansible liquid within the enclosure and surrounding the two bellows, a cylinder below the pilot valve, a loose fitting pilot piston therein, a continuously open restriction directly connecting the inlet with the cylinder above the pilot piston, a main cylinder below the pilot cylinder and larger than the pilot cylinder, a main piston in the main cylinder and adapted to be acted upon by the gas leakage around the pilot piston, the main piston being adapted to rest across and close the main port, and to overhang the same and thereby be subjected to an opening influence of inlet pressure, and a passage through the main piston to the outlet side thereof, the pilot piston being adapted to close said passage and to overhang the same to be subjected to upward influence of leakage pressure above the main piston.

7. In a valve having a housing with an inlet, an outlet, a partition therebetween, and a port through the partition, a main pressure-responsive device with a main valve controlling said port operated thereby, a first pressure chamber of which the main pressure-responsive device comprises a movable wall portion, the outer side of said pressure-responsive device being exposed to the inlet to receive high fluid pressure therefrom and having an effective unbalanced pressure receiving area whereby said high fluid pressure can displace the main valve, means for restrictedly conducting said high fluid pressure to the inner side of the pressure-responsive device within the main pressure chamber, an exhaust from the main pressure chamber, to relieve pressure therein derived from the restricted conducting means, a second pressure-responsive device and a second valve operated thereby to control said exhaust, a second pressure chamber of which the second pressure-responsive device is a wall portion subjected on its inner side to pressure therein, the second pressure-responsive device being subjected on its outer side to high pressure derived from the inlet, means constantly connecting the second pressure chamber with the inlet and to exhaust, comprising passage means directly connecting the inlet, the second pressure chamber, and the exhaust, and a pilot valve controlling the passage means to regulate the pressure in said second chamber, whereby when said pilot valve operates to reduce pressure in the second pressure chamber, the second pressure-responsive device will operate to open the second valve, exhausting pressure in the first pressure chamber, whereupon pressure acting on the outside of the main pressure-responsive device will operate the main valve.

8. In a valve having a housing with an inlet, an outlet, a partition therebetween, and a port through the partition, a main pressure-responsive device with a main valve controlling said port operated thereby, a first pressure chamber of which the main pressure-responsive device comprises a movable wall portion, the outer side of said pressure-responsive device being exposed to the inlet to receive high fluid pressure therefrom and having an effective unbalanced pressure receiving area whereby said high fluid pressure can displace the main valve, means for restrictedly conducting said high fluid pressure to the inner side of the pressure-responsive device within the main pressure chamber, an exhaust from the main pressure chamber, to relieve pressure therein derived from the restricted conducting means, a second pressure-responsive device and a second valve operated thereby to control said exhaust, a second pressure chamber of which the second pressure-responsive device is a wall portion subjected on its inner side to pressure therein, the second pressure-responsive device being subjected on its outer side to high pressure derived from the inlet, means constantly connecting the second pressure chamber with the inlet and to exhaust, comprising passage means directly connecting the inlet, the second pressure chamber, and the exhaust, and a pilot valve controlling the passage means to regulate the pressure in said second chamber, whereby when said pilot valve operates to reduce pressure in the second pressure chamber, the second pressure-responsive device will operate to open the second valve, exhausting pressure in the first pressure chamber, whereupon pressure acting on the outside of the main pressure-responsive device will operate the main valve, said main pressure-responsive device comprising a piston and the first pressure chamber having a cylinder portion in which the piston reciprocates.

9. In a valve having a housing with an inlet, an outlet, a partition therebetween, and a port through the partition, a main pressure-responsive device with a main valve controlling said port operated thereby, a first pressure chamber of which the main pressure-responsive device comprises a movable wall portion, the outer side of said pressure-responsive device being exposed to the inlet to receive high fluid pressure therefrom and having an effective unbalanced pressure receiving area whereby said high fluid pressure can displace the main valve, means for restrictedly conducting said high fluid pressure to the inner side of the pressure-responsive device within the main pressure chamber, an exhaust from the main pressure chamber, to relieve pressure therein derived from the restricted conducting means, a second pressure-responsive device and a second valve operated thereby to control said exhaust, a second pressure chamber of which the second pressure-responsive device is a wall portion subjected on its inner side to pressure therein, the second pressure-responsive device being subjected on its outer side to high pressure derived from the inlet, means constantly connecting the second pressure chamber with the inlet and to exhaust, comprising passage means directly connecting the inlet, the second pressure chamber, and the exhaust, and a pilot valve controlling the passage means to regulate the pressure in said second chamber, whereby when said pilot valve operates to reduce pressure in the second pressure chamber, the second pressure-responsive device will operate to open the second valve, exhausting pressure in the first pressure chamber, whereupon pressure acting on the outside of the main pressure-responsive device will operate the main valve, said main pressure-responsive device comprising a piston and the first pressure chamber having a cylinder portion in which the piston reciprocates, said piston fitting into said cylinder with a loose fit providing a clearance, the clearance comprising means to restrictedly conduct high fluid pressure to the inside of the first pressure chamber.

10. In a valve having a housing with an inlet, an outlet, a partition therebetween, and a port through the partition, a main pressure-responsive device with a main valve controlling said port operated thereby, a first pressure chamber of which the main pressure-responsive device comprises a movable wall portion, the outer side of said pressure-responsive device being exposed to the inlet to receive high fluid pressure therefrom and having an effective unbalanced pressure receiving area whereby said high fluid pressure can displace the main valve, means for restrictedly conducting said high fluid pressure to the inner side of the pressure-responsive device within the main pressure chamber, an exhaust from the main pressure chamber, to relieve pressure therein derived from the restricted conducting means, a second pressure-responsive device and a second valve operated thereby to control said exhaust, a second pressure chamber of which the second pressure-responsive device is a wall portion subjected on its inner side to pressure therein, the second pressure-responsive device being subjected on its outer side to high pressure derived from the inlet, means constantly connecting the second pressure chamber with the inlet and to exhaust, comprising passage means directly connecting the inlet, the second pressure chamber, and the exhaust, and a pilot valve controlling the passage means to regulate the pressure in said second chamber, whereby when said pilot valve operates to reduce pressure in the second pressure chamber, the second pressure-responsive device will operate to open the second valve, exhausting pressure in the first pressure chamber, whereupon pressure acting on the outside of the main pressure-responsive device will operate the main valve, one of said pressure-responsive devices comprising a piston and its pressure chamber having a cylinder portion in which the piston reciprocates, there being a clearance in the cylinder outside the piston constituting the means to restrictedly conduct high pressure fluid to the inside of the main pressure chamber.

11. In a valve having a housing with an inlet, an outlet, a partition therebetween, and a port through the partition, a main pressure-responsive device with a main valve controlling said port operated thereby, a first pressure chamber of which the main pressure-responsive device comprises a movable wall portion, the outer side of said pressure-responsive device being exposed to the inlet to receive high fluid pressure therefrom and having an effective unbalanced pressure receiving area whereby said high fluid can displace the main valve, means for restrictedly conducting said high fluid pressure to the inner side of the pressure-responsive device within the main pressure chamber, an exhaust from the main pressure chamber, to relieve pressure therein derived from the restricted conducting means, a second pressure-responsive device and a second valve operated thereby to control said exhaust, a second pressure chamber of which the second pressure-responsive device is a wall portion subjected on its inner side to pressure therein, the second pressure-responsive device being subjected on its outer side to high pressure derived from the inlet, means constantly connecting the second pressure chamber with the inlet and to exhaust, comprising passage means directly connecting the inlet, the second pressure chamber, and the exhaust, and a pilot valve controlling the passage means to regulate the pressure in said second chamber, whereby when said pilot valve operates to reduce pressure in the second pressure chamber, the second pressure-responsive device will operate to open the second valve, exhausting pressure in the first pressure chamber, whereupon pressure acting on the outside of the main pressure-responsive device will operate the main valve, the main pressure-responsive device comprising a piston, and the first pressure chamber having a cylindrical portion in which the piston slides, the exhaust from the first pressure chamber comprising an opening through the piston and main valve to the outlet side of the main valve, the second valve being adapted to open and close said opening.

12. In a valve having a housing with an inlet, an outlet, a partition therebetween, and a port through the partition, a main pressure-responsive device with a main valve controlling said port operated thereby, a first pressure chamber of which the main pressure-responsive device comprises a movable wall portion, the outer side of said pressure-responsive device being exposed to the inlet to receive high fluid pressure therefrom and having an effective unbalanced pressure receiving area whereby said high fluid pressure can displace the main valve, means for restrictedly conducting said high fluid pressure to the inner side of the pressure-responsive device within the main pressure chamber, an exhaust from the main pressure chamber, to relieve pressure therein derived from the restricted conducting means, a second pressure-responsive device and a second valve operated thereby to control said exhaust, a second pressure chamber of which the second pressure-responsive device is a wall portion subjected on its inner side to pressure therein, the second pressure-responsive device being subjected on its outer side to high pressure derived from the inlet, means constantly connecting the second pressure chamber with the inlet and to exhaust, comprising a passage directly connecting the inlet, the second pressure chamber and the exhaust, and a pilot valve controlling the connecting means to regulate the pressure in said second chamber, whereby when said pilot valve operates to reduce pressure in the second pressure chamber, the second pressure-responsive device will operate to open the second valve, exhausting pressure in the first pressure chamber, whereupon pressure acting on the outside of the main pressure-responsive device will operate the main valve, and means to operate the pilot valve in a gradual manner between its extreme positions controlling said connecting means.

13. In a valve having a housing with an inlet, an outlet, a partition therebetween, and a port through the partition, a main pressure-responsive device with a main valve controlling said port operated thereby, a first pressure chamber of which the main pressure-responsive device comprises a movable wall portion, the outer side of said pressure-responsive device being exposed to the inlet to receive high fluid pressure therefrom and having an effective unbalanced pressure receiving area whereby said high fluid pressure can displace the main valve, means for restrictedly conducting said high fluid pressure to the inner side of the pressure-responsive device within the main pressure chamber, an exhaust from the main pressure chamber, to relieve pressure therein derived from the restricted conducting means, a second pressure-responsive device and a second valve operated thereby to control said exhaust, a second pressure chamber of which the second pressure-responsive device is a wall portion subjected on its inner side to pressure therein, the second pressure-responsive device being subjected on its outer side to high pressure derived from the inlet, means constantly connecting the second pressure chamber with the inlet and to exhaust comprising a passage directly connecting the inlet, the second pressure chamber and the exhaust, and a pilot valve controlling the connecting means to regulate the pressure in said second chamber, whereby when said pilot valve operates to reduce pressure in the second pressure chamber, the second pressure-responsive device will operate to open the second valve, exhausting pressure in the first pressure chamber, whereupon pressure acting on the outside of the main pressure-responsive device will operate the main valve, thermostatic means to operate the pilot valve including a closed system containing an expansible fluid, and means moved incrementally upon expansion and contraction of the fluid, and means to transmit incremental movements of the moved means to the pilot valve.

14. In a valve construction, a housing having a high pressure inlet and a low pressure outlet, a valving partition between the inlet and outlet having a valve port therethrough, a main, first valve cooperating with the valve port, the valve port providing pressure reduction when flow occurs through the port, with an intermediate pressure zone adjacent the port on the outlet side of the valve, a first movable wall for operating the first valve, the movable wall having a first area subjected to inlet pressure tending to open the valve and a pressure chamber in which there is an opposite second area of the wall, with restricted communication from the inlet to the pressure chamber to introduce high inlet pressures restrictedly to the second area of the wall, an exhaust passage from the second area larger than the restricted communication to the second area, said passage extending to said intermediate pressure zone, a control valve controlling said passage, the control valve having a movable wall for its operation, one side of the movable wall of the control valve being subjected to the pressure in the pressure chamber of the main valve when the control valve is closed, and the control valve, when opened, opening said pressure chamber to the exhaust passage, a control valve pressure chamber on the opposite side of the movable wall of the control valve, the movable wall separating the pressure chambers, means directly restrictedly connecting the high pressure inlet side of the main valve to said control valve pressure chamber, an exhaust for said control valve pressure chamber, and a pilot valve for controlling flow through the last named exhaust.

15. In a valve construction, a housing having a high pressure inlet and a low pressure outlet, a valving partition between the inlet and outlet having a valve port therethrough, a main, first valve cooperating with the valve port, the valve port providing pressure reduction when flow occurs through the port, with an intermediate pressure zone adjacent the port on the outlet side of the valve, a first movable wall for operating the first valve, the movable wall having a first area subjected to inlet pressure tending to open the valve and a pressure chamber in which there is an opposite second area of the wall, with restricted communication from the inlet to the pressure chamber to introduce high inlet pressure restrictedly to the second area of the wall, an exhaust passage from the second area larger than the restricted communication to the second area, said passage extending to said intermediate pressure zone, a control valve controlling said passage, the control valve having a movable wall for its operation, one side of the movable wall of the control valve being subjected to the pressure in the pressure chamber of the main valve when the control valve is closed, and the control valve, when opened, opening said pressure chamber to the exhaust passage, a control valve pressure chamber on the opposite side of the movable wall of the control valve, the movable wall separating the pressure chambers, means directly restrictedly connecting the high pressure inlet side of the main valve to said control valve pressure chamber, an exhaust for said control valve pressure chamber, a pilot valve for controlling flow through the last named exhaust, and means responsive to changes in predetermined physical conditions for operating the control valve.

16. In a valve construction, a housing having a high pressure inlet and a low pressure outlet, a valving partition between the inlet and outlet having a valve port therethrough, a main, first valve cooperating with the valve port, the valve port providing pressure reduction when flow occurs through the port, with an intermediate pressure zone adjacent the port on the outlet side of the valve, a first movable wall for operating the first valve, the movable wall having a first area subjected to inlet pressure tending to open the valve and a pressure chamber in which there is an opposite second area of the wall, with restricted communication from the inlet to the pressure chamber to introduce high inlet pressure restrictedly to the second area of the wall, an exhaust passage from the second area larger than the restricted communication to the second area, said passage extending to said intermediate pressure zone, a control valve controlling said passage, the control valve having a movable wall for its operation, one side of the movable wall of the control valve being subjected to the pressure in the pressure chamber of the main valve when the control valve is closed, and the control valve, when opened, opening said pressure chamber to the exhaust passage, a control valve pressure chamber on the opposite side of the movable wall of the control valve, the movable wall separating the pressure chambers, means directly restrictedly connecting the high pressure inlet side of the main valve to said control valve pressure chamber, an exhaust for said control valve pressure chamber, and a pilot valve for controlling flow through the last named exhaust, each movable wall and its pressure chamber comprising a cylinder and a loosely fitting piston therein.

17. In a valve construction, a housing having a high pressure inlet and a low pressure outlet, a valving partition between the inlet and outlet having a valve port therethrough, a main, first valve cooperating with the valve port, the valve port providing pressure reduction when flow occurs through the port, with an intermediate pressure zone adjacent the port on the outlet side of the valve, a main cylinder in the housing, a main valve piston in the cylinder, the cylinder providing a pressure chamber on one side of the piston, to receive pressure tending to close the main valve, the piston on its opposite side being subjected to inlet pressure, tending to open the main valve, a passage through the main valve and piston to exhaust the chamber to the intermediate pressure zone of the housing, a control valve controlling said port and having an operating piston in the chamber which piston has an area subjected to said chamber pressure, tending to open the control valve, a cylinder in which the control valve piston operates, and providing a control piston pressure chamber receiving pressure tending to close the control valve, means restrictedly admitting high inlet pressure to the main cylinder pressure chamber at rates less than the exhaust capacity of the passage through the main valve that is controlled by the control valve, means directly restrictedly connecting the high pressure inlet to the control piston chamber, and an exhaust line for said control piston chamber of greater flow capacity than the said restricted admitting means, and pilot valve means controlling said exhaust line of the control piston chamber.

18. In a valve construction, a housing having a high pressure inlet and a low pressure outlet, a valving partition between the inlet and outlet having a valve port therethrough, a main, first valve cooperating with the valve port, the valve port providing pressure reduction when flow occurs through the port, with an intermediate pressure zone adjacent the port on the outlet side of the valve, a main cylinder in the housing, a main valve piston in the cylinder, the cylinder providing a pressure chamber on one side of the piston, to receive pressure tending to close the main valve, the piston on its opposite side being subjected to inlet pressure, tending to open the main valve, a passage through the main valve and piston to exhaust the chamber to the intermediate pressure zone of the housing, a control valve controlling said port and having an operating piston in the chamber which piston has an area subjected to said chamber pressure, tending to open the control valve, a cylinder in which the control valve piston operates, and providing a control piston pressure chamber receiving pressure tending to close the control valve, means restrictedly admitting high inlet pressure to the main cylinder pressure chamber at rates less than the exhaust capacity of the passage through the main valve that is controlled by the control valve, means directly restrictedly connecting the high pressure inlet to the control piston chamber, and an exhaust line for said control piston chamber of greater flow capacity than the said restricted admitting means, and pilot valve means controlling said exhaust line of the control piston chamber, said last named pilot valve means including a mechanism movable in response to predetermined physical conditions and a pilot valve operated thereby.

EDWARD F. KOUNOVSKY.
JOHN E. DUBE.

REFERENCES CITED

The following references are of record in the file of this patent:

UNITED STATES PATENTS

| Number | Name | Date |
| --- | --- | --- |
| 629,789 | Honiball | Aug. 1, 1899 |
| 1,031,913 | Casse | July 9, 1912 |
| 1,254,869 | Watrous | Jan. 29, 1918 |
| 1,540,267 | Langston | June 2, 1925 |
| 1,794,640 | Owens | Mar. 3, 1931 |
| 1,850,354 | Owens | Mar. 22, 1932 |
| 1,925,530 | Gotthardt | Sept. 5, 1933 |
| 2,013,480 | Sandvoss | Sept. 3, 1935 |
| 2,264,261 | Erbguth | Nov. 25, 1941 |
| 2,321,743 | Guibert | June 15, 1943 |
| 2,416,875 | Kehoe | Mar. 4, 1947 |

FOREIGN PATENTS

| Number | Country | Date |
| --- | --- | --- |
| 490,081 | Great Britain | Aug. 9, 1938 |
| 582,088 | Germany | Aug. 8, 1933 |
| 833,361 | France | July 18, 1938 |